United States Patent [19]

Grether

[11] 3,905,313

[45] Sept. 16, 1975

[54] SEEDING MACHINE

[75] Inventor: Tobias H. A. Grether, Camarillo, Calif.

[73] Assignee: Cal-Turf, Inc., Camarillo, Calif.

[22] Filed: Dec. 6, 1973

[21] Appl. No.: 422,329

[52] U.S. Cl. .......................... 111/1; 111/10; 47/56
[51] Int. Cl.² .................................... A01C 7/08
[58] Field of Search ............... 111/85, 1, 10; 47/56

[56] References Cited
UNITED STATES PATENTS

| | | | |
|---|---|---|---|
| 1,500,437 | 7/1924 | Burton | 111/10 |
| 2,524,871 | 10/1950 | Andrus | 111/1 |
| 2,605,589 | 8/1952 | Kuestner | 47/56 |
| 3,315,623 | 4/1967 | Tschudy, Jr. | 111/1 |

Primary Examiner—Stephen C. Pellegrino

[57] ABSTRACT

A seeding machine and method wherein a generally uniform thin layer of dirt is skimmed from the ground, mixed with a seed such as lawn grass seed, and the mixture then redeposited on the ground in an even layer onto a strip of open mesh fabric, preferably waterproof plastic, the mixture of dirt and seed and the open mesh fabric beneath it then being rolled or otherwise smoothed, the growth from the seed, young sod, for example, being harvested by lifting the open mesh fabric and with it the young sod or similar growth, the lifting preferably being accomplished by rolling the sod and open mesh fabric into transportable rolls, and replanting by depositing and unrolling the sod and open mesh fabric at the new site.

9 Claims, 9 Drawing Figures

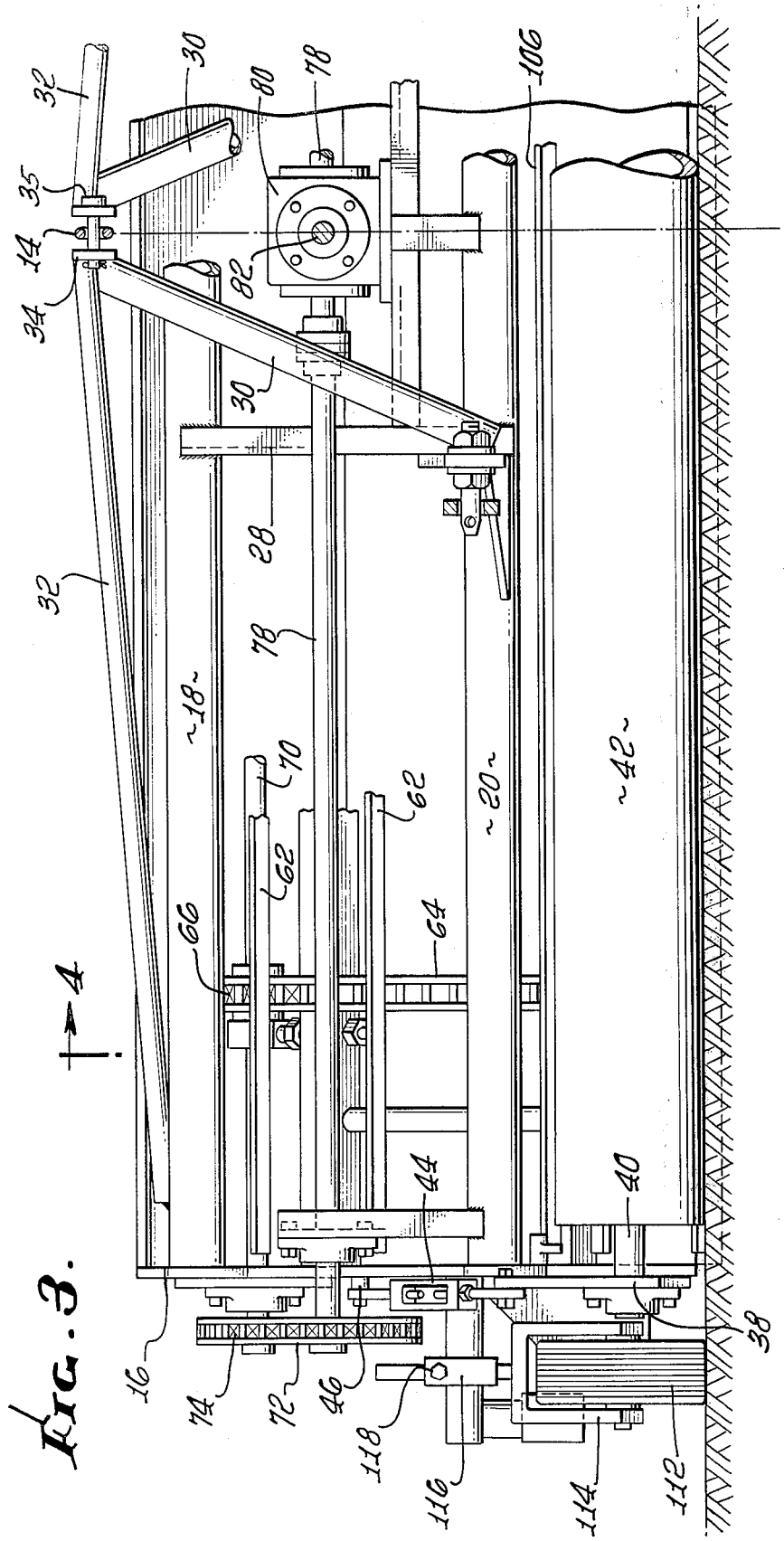
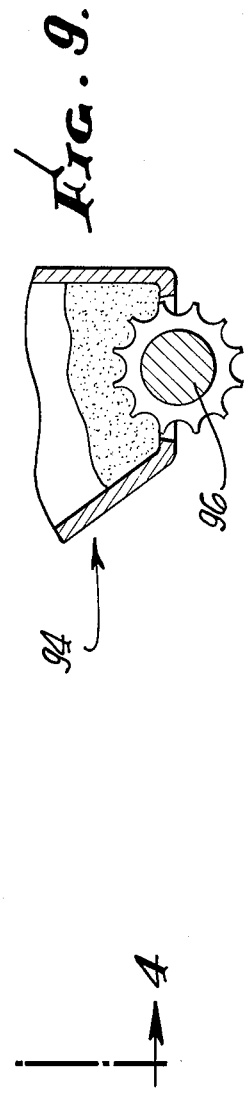

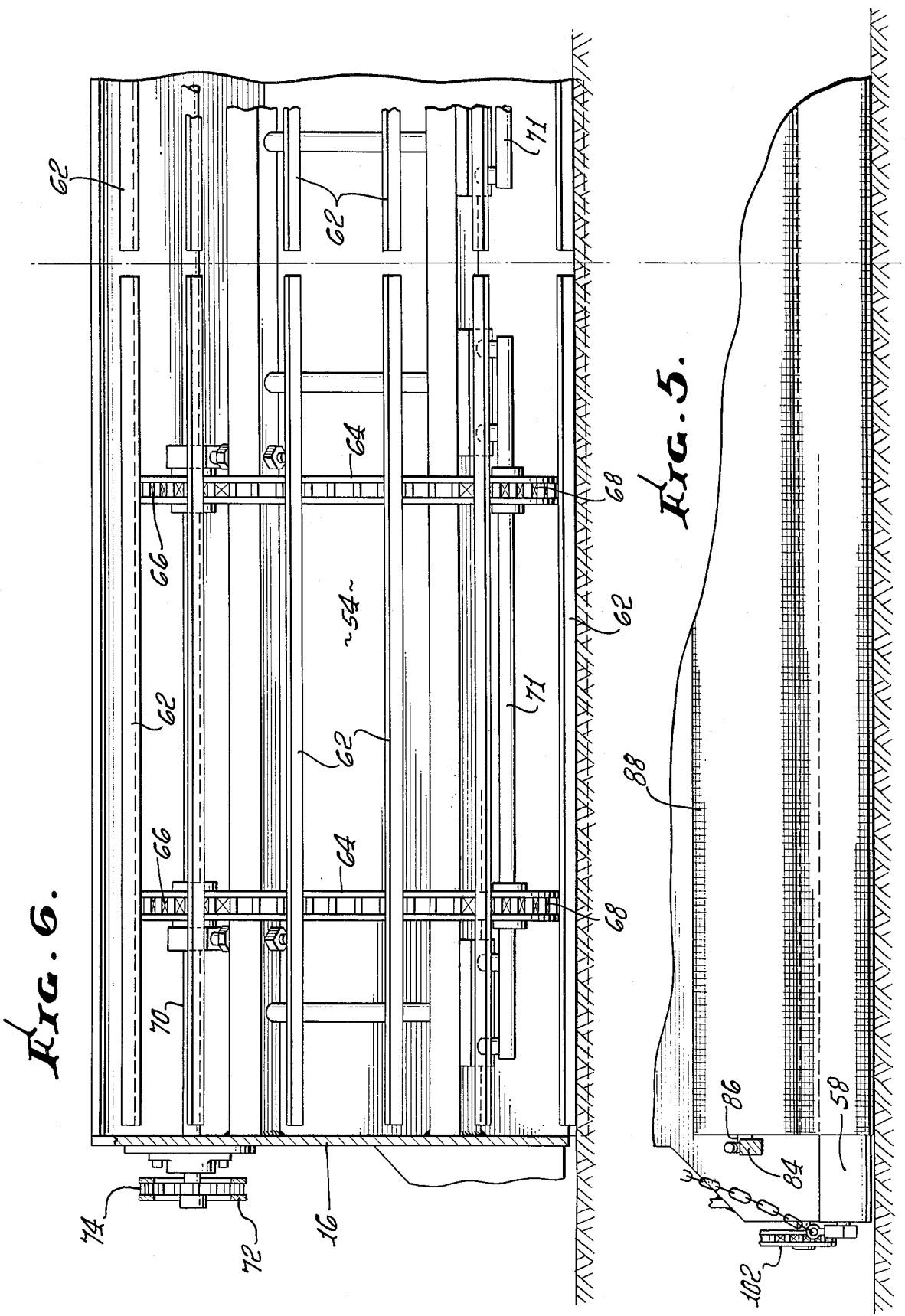

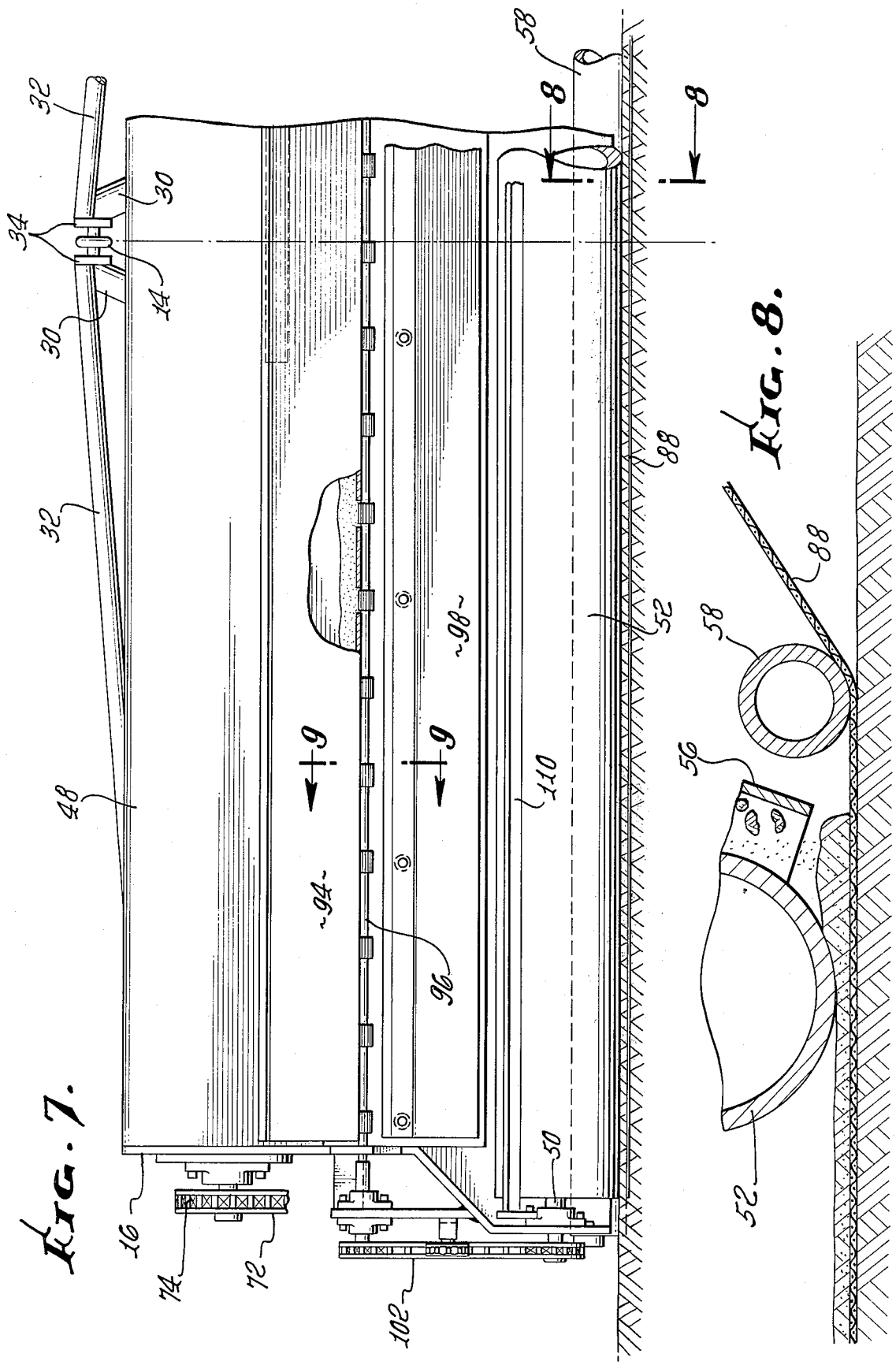

3,905,313

SEEDING MACHINE

The invention relates to a seeding machine and a method of seeding and harvesting, and is particularly adapted for use in seeding, growing and harvesting sod produced from lawn grass seed, although it may be adaptable for other uses.

Growers of sod for sale are often concerned with the relatively long periods of time during which a growing area must be tied up in producing a crop or growth of sod from seed which is sufficiently strong and manageable to permit it to be cut and rolled into rolls for transportation and laying at a different location.

If the sod is cut and rolled before a strong mat of roots has developed, it is not only difficult to handle but may actually disintegrate and render it unfit for use. To overcome the difficultes encountered with the young loosely matted sod, it must be permitted to grow for a longer period of time until the roots become stronger and more closely matted, thereby decreasing the number of harvests from a given area in a given time.

It is an object of the invention to provide a sod producing method and mesh wherein the seed is sown in a mixture with dirt over an elongated strip of open mesh material, preferably a water-proof plastic netting which will permit the growth of roots from the overlying seed and dirt layer through the apertures in the mesh and into the ground beneath the mesh, wherein when the sod is to be removed, the open mesh fabric can be lifted, preferably by rolling it and the sod, said open mesh fabric providing a flexible skeleton or framework for the sod to hold the young tender strips of sod together during harvesting, transporting and laying.

Another object is the provision of apparatus including a ground smoothing device followed by a blade or other suitable means for skimming a thin layer of dirt from the ground as the machine progresses over it, elevating the skimmed dirt, mixing the elevated dirt with grass seed or other suitable seed or seedlings, laying an elongated strip of open mesh plastic material, depositing the mixture of dirt and seed on the open mesh material, and finally, rolling the layer of dirt and seed which has been deposited over the open mesh material.

A further object is to provide apparatus of the type described above wherein, as the skimming means removes a layer of dirt from the ground, it forms a small window along each side of the skimming cut, means is provided for flattening or smoothing out the windrows so that when the open mesh fabric is laid on the ground, the surface will be comparatively smooth and level.

Another object is to provide a method of seeding, growing, harvesting and relocating the young growth. This includes spreading an elongated strip of open mesh fabric on the ground, mixing a given quantity of dirt and seed, depositing the mixture in a substantially uniform layer over the open mesh fabric, irrigating the seed to cause it to sprout and grow until a root structure is produced in the layer of dirt above the fabric and to some extent downwardly through the fabric, harvesting the new growth by lifting the open mesh fabric and new growth together, the lifting preferably comprising rolling of the fabric and the new growth sod, transporting it to the site for permanent laying and growth while in the rolled condition, and then depositing the new growth and open mesh fabric together by unrolling it as a unit at the new site, leaving the open mesh fabric mostly beneath the layer of growth or sod, the open mesh fabric being of an inert material which will have no effect upon continued and permanent growth of the sod.

The above and other objects and advantages of the invention will more fully appear from the following description made in connection with the accompanying drawings:

FIG. 3 is an enlarged sectional view taken on the line 3—3 of FIG. 1 with some portions broken away;

FIG. 5 is a sectional view taken approximately on the line 5—5 of FIG. 4;

FIG. 6 is a sectional view taken approximately on the line 6—6 of FIG. 4 with part of one side broken away;

FIG. 7 is an enlarged view taken approximately on the line 7—7 of FIG. 1 with portions broken away;

FIG. 8 is an enlarged sectional detail taken approximately on the line 8—8 of FIG. 7;

FIG. 9 is an enlarged sectional detail taken approximately on the line 9—9 of FIG. 7.

Figure 1:
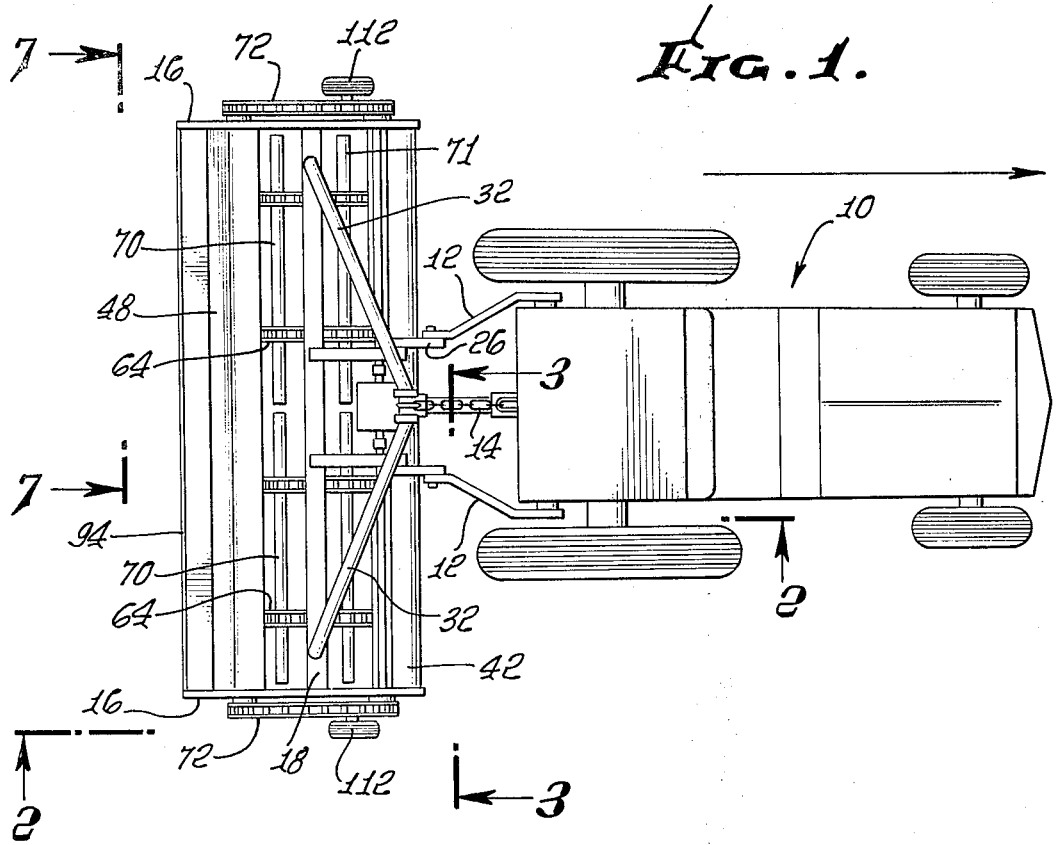
FIG. 1 is a plan view of an embodiment of the invention showing it connected to a tractor.
Figure 4:
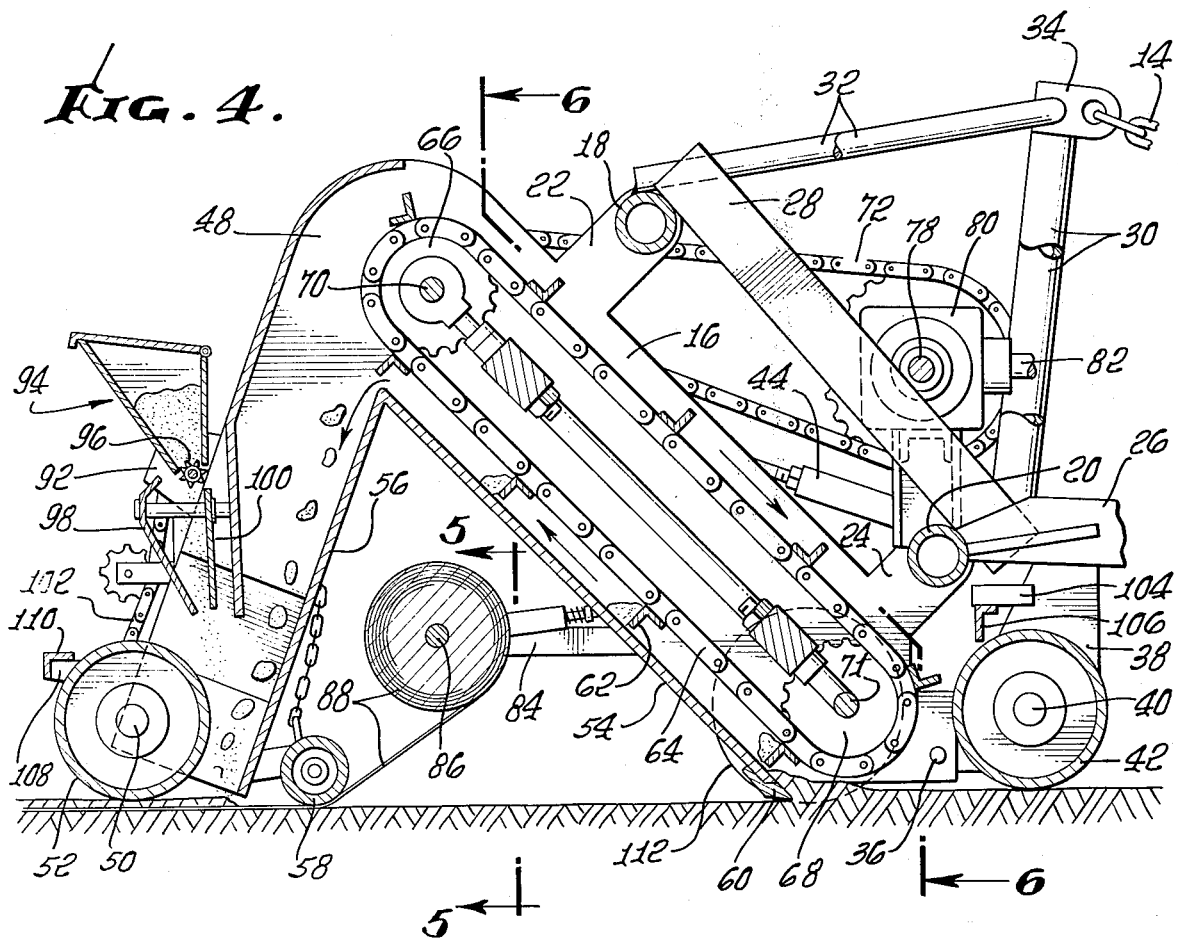
FIG. 4 is a sectional view taken approximately on the line 4—4 of FIG. 3.
Figure 2:
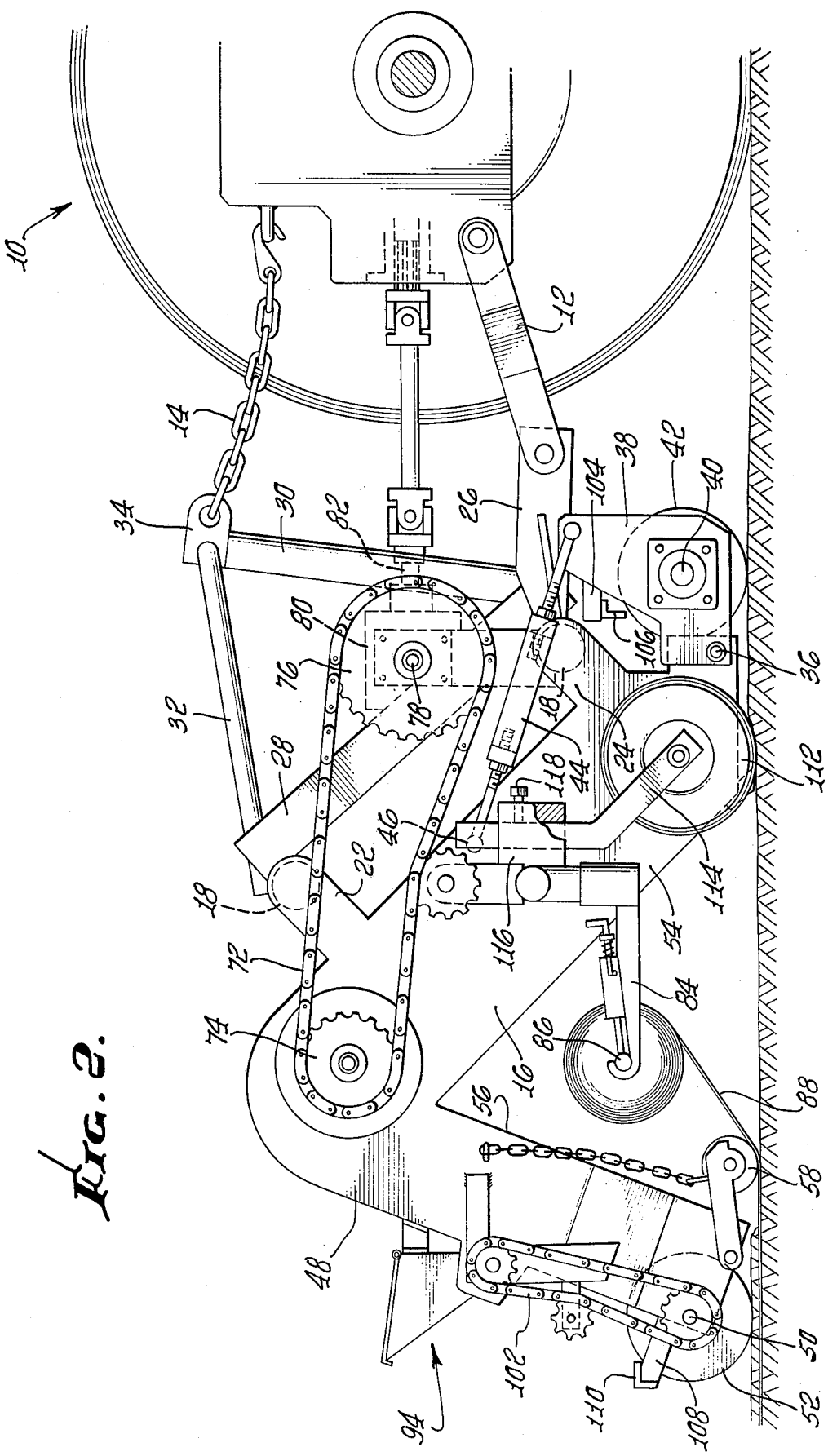
FIG. 2 is an enlarged sectional view taken on the line 2—2 of FIG. 1.

In the drawings there is shown a tractor generally indicated at 10, the tractor having draw bars 12 and an upper linkage comprising a chain 14.

The seeder includes a pair of side panels 16 connected by horizontal tubular members 18 and 20, the tubular members more specifically being secured to brackets 22 and 24 by any suitable means, such as welding.

Connected to the draw bars 12 are links 26 which at their rear ends are secured to link supporting members 28, the latter being secured as by welding between the upper and lower cross members 18 and 20. A pair of braces 30 extend upwardly and toward each other from the lower ends of the link supporting members 28. The upper ends of the braces 30 are connected to laterally and rearwardly extending braces 32 whose outer ends are connected to the upper frame cross member 18. At their inner ends the elongated braces 32 are provided with apertured ears 34 connected by a bolt 35 to which the rear end of the chain 14 is secured.

The frame side channels 16 are shown extending upwardly and rearwardly from their lower ends. They are connected by pivots 36 to lever plates 38 mounted on each end of a cross shaft 40, the cross shaft rotatably supporting a forward roller 42 which extends across the width of the frame. The upwardly extending leg of the lever plate 38 is connected by a turn buckle 44 to a point 46 on each frame side plate 16. Adjustment of the turn buckle 44 results in raising and lowering the lower front portion of the frame plates or side members 16 relative to the front roller 42 and relative to the ground.

Extending downwardly and rearwardly from the upper ends of the side plates 16 are integral plate portions 48. Extending between the lower rear portion of the rear plate portions 48 is a shaft 50 carrying a roller 52 which supports the rear portion of the frame. This roller also extends across the width of the frame.

Extending between the frame side plates 16 is an upwardly and rearwardly slanting bottom plate 54 and from its upper end a dirt and sod guide plate 56 extends downwardly terminating a short distance above ground level and in front of the rear roller 52. A small roller 58 lies just in front of the guide plate 56 and it also extends across the full width of the machine.

The lower front edge of the bottom plate 54 is provided with a cutter blade 60 extending entirely across the machine. This blade, when the forward end of the frame is lowered by manipulation of the front roller lever arms 38, skims a layer of dirt from the ground, causing it to begin to enter the housing defined by the side plates 16 and bottom plate 54. At this point the dirt is picked up by the conveyor blades 62 spaced on conveyor chains 64, the chains being located one at each side of the machine and running over an upper sprocket 66 and a lower sprocket 68. These sprockets are rotatable upon an upper cross shaft 70 and a lower cross shaft 71 respectively. The direction of the conveyor chain is indicated by arrows. The conveyor is driven by a chain 72 on each side of the machine trained about driven sprockets 74 and drive sprockets 76. The drive sprockets are mounted on cross shaft 78 extending from a gear box 80 having a power shaft 82 suitably connected to the power takeoff, not shown, which is conventional with most tractors.

Mounted between arms 84 extending rearwardly from the frame side plates 16, the rear ends of said arms support a shaft 86 adapted to carry a roll of open mesh plastic material 88, having a width substantially the same as the lengths of rolls 58 and 52.

The dirt and sod guide plate 56 extends between rear frame side plates 48. These side plates have brackets 92 between which is supported a seed hopper 94 having a bottom outlet with a seed dispensing roller 96 rotatably supported therein as is clearly shown in FIG. 9. Below the bottom of the hopper 94 are seed deflector plates 98 and 100, the deflector plates and the dispensing roller 96 all extending across the width of the machine.

The dispensing roller 96 is driven by a chain 102 trained around suitable sprockets on the rear roller shaft 50 and on the end of the dispensing roller 96 respectively.

Extending between the lever arms 38 on the front roller shaft 40 is a cross member 104 carrying a front roller scraper 106. Extending between brackets 108 secured to the rear frame plates 48 is a rear roller scraper 110. These two scrapers are provided to keep dirt from accumulating objectionably on the front and rear rollers.

With the machine connected to a tractor, the lever elements 38 on the front roller shaft 40 are adjusted so that the dirt skimming blade 60 will skim or shave off a thin layer of dirt from the surface of the ground. Preferably, the ground surface previously been broken up and as the machine moves over it, the front roller 42 will smooth the ground surface so that a fairly uniform layer can be skimmed from the ground by the blade 60. This dirt is carried upwardly by the conveyor and adjacent the upper end of the conveyor it is dumped down between the rear side plates 48 and on the guide plate 56. As the dirt falls down, it mingles with seed being discharged from a seed hopper 94 and this mixture drops onto the ground across the width of the machine and upon the wide elongated strip of open mesh fabric 88 which has been fed beneath and spread out by the small roller 58. The layer of dirt and seed and the underlying layer of open mesh fabric are then smoothed and somewhat compacted by the rear roller 52, When the blade 60 makes its shallow wide cut, a small windrow of dirt is thrown up by each end of the blade. This windrow is flattened out by wheels 112 at either side of the frame defined by the side plates 16. These wheels are mounted on forks 114 which are vertically adjustable through brackets 116, set screws 118 being provided to lock the forks 114 and wheels 112 in desired vertical positions.

The open mesh fabric 88 is preferably in the form of a plastic material having openings which may be of any desired size, the openings being defined by portions of the plastic material which are relatively narrow between the openings.

After the seed has sprouted in the layer of dirt, having been kept moist by natural or artificial irrigation, root structure will begin to form. Some of the root structure will lie above the open mesh fabric 88 and some will pentrate between the openings in the fabric and into the ground below it only for a short distance.

In operations, such as the growing of sod on a commercial basis, it is desirable to be able to harvest the sod or other growth when it is fairly young and normally susceptible to breakage or disintegration when cut and rolled in the conventional manner. However, with the open mesh fabric utilized, the sod can be harvested in rolls as wide as the width of fabric 88 and this strong light flexible material will provide a skeleton which will give strength to the sod when it is harvested in rolls, being transported and deposited on the site where it will be grown permanently.

By reason of the ability to harvest the sod at a more tender age and in a more fragile condition, it is possible to reseed the area from which the sod was taken much sooner than when the sod is grown and harvested by conventional methods without the open mesh plastic material. Furthermore, the machine for practicing the method greatly facilitates planting and this planting operation is accomplished by simultaneous placement of the open mesh fabric in position for the reception of the seed and dirt mixture thereon while the machine is moving over the ground during the dirt skimming and seed mixing and depositing operation.

In referring to "seed" herein, it is to be understood that this includes small plantings, cuttings and other plant propagation items.

It is also to be understood that the open mesh plastic fabric can be utilized to hold together rooted plant varities, such as commonly used succulents used as ground covers, many of which have the characteristic of not matting or meshing their roots and consequently would be impossible to harvest and transport for transplanting at a permanent site.

It should be understood that various changes can be made in the form, details, arrangement and proportions of the various parts, and in the details of the method, without departing from the spirit of the invention.

I claim:

1. A seeding machine comprising an ambulant main frame, a dirt skimming element on the lower forward portion of the frame, a dirt elevator carried by the frame and having a dirt inlet adjacent the dirt skimming element, said elevator having an elevated dirt discharge adapted to direct the elevated dirt to the ground rearwardly of the dirt inlet of the elevator, a supply of open mesh sheet material supported by the frame having means for feeding and laying the sheet on the ground rearwardly of the dirt skimming element, a seed supply device on said frame having a seed outlet directed toward the ground in the path of flow of dirt from said elevator, and the frame including means extending downwardly from said elevator for guiding the discharged dirt and seed in a layer onto the open mesh sheet material.

2. The structure in claim 1, and said elevated dirt discharge, said seed supply device and said means for guiding the discharged dirt and seed onto the open mesh sheet material having dimensions transversely of the frame and of the direction of movement of the frame approximating the width of the sheet of open mesh fabric.

3. The structure in claim 1, and a ground leveling device carried by and extending across the lower front portion of the frame in front of the skimming element and the dirt elevator.

4. The structure in claim 3, and said dirt skimming device adjustable upwardly and downwardly relative to the ground leveling device.

5. The structure in claim 3, and said ground leveling device comprising a roller at least partially supporting the forward portion of said frame, said roller being approximately coextensive with said dirt skimming element transversely of the frame.

6. The structure in claim 3, and said dirt skimming element comprising a blade extending transversely of the frame, and said ground leveling device comprising a roller carried by the frame and extending transversely of the frame in front of and parallel to the dirt skimming element.

7. The structure in claim 6, and said elevator including an upwardly and rearwardly directed trough, means supported by the frame and movable upwardly and rearwardly in said trough for moving dirt upwardly and rearwardly therein, the trough having a leading bottom edge comprising the dirt skimming element, and the ground leveling device and the dirt skimming element being articulated on a transverse pivotal axis.

8. The structure in claim 7, and means for raising and lowering said transverse pivotal axis and the connected portions of said dirt skimming element and ground leveling device.

9. The structure in claim 1, and said dirt skimming element having opposite end portions defining the width of the skimming cut made thereby, and smoothing devices carried by the frame adjacent said opposite end portions to flatten and smooth berms or windrows produced by said end portions in the skimming operation.

\* \* \* \* \*